United States Patent
Li

(10) Patent No.: US 9,662,930 B2
(45) Date of Patent: May 30, 2017

(54) PAINTING STRUCTURE AND PAINTING FRAME STRUCTURE

(71) Applicant: Sheen Design, Inc., San Jose, CA (US)

(72) Inventor: Yu Li, Shanghai (CN)

(73) Assignee: SHEEN DESIGN, INC., San Jose, CA (US)

(*) Notice: Subject to any disclaimer, the term of this patent is extended or adjusted under 35 U.S.C. 154(b) by 0 days.

(21) Appl. No.: 15/005,019

(22) Filed: Jan. 25, 2016

(65) Prior Publication Data

US 2016/0229225 A1 Aug. 11, 2016

(30) Foreign Application Priority Data

Feb. 10, 2015 (CN) .................... 2015 2 0095186 U

(51) Int. Cl.
| | | |
|---|---|---|
| *B44F 1/00* | (2006.01) | |
| *B44F 1/04* | (2006.01) | |
| *B44F 1/08* | (2006.01) | |
| *B44F 7/00* | (2006.01) | |
| *B44C 3/02* | (2006.01) | |
| *B32B 5/02* | (2006.01) | |
| *B32B 5/24* | (2006.01) | |
| *B32B 29/00* | (2006.01) | |
| *B32B 3/26* | (2006.01) | |
| *B32B 3/08* | (2006.01) | |

(52) U.S. Cl.
CPC .............. *B44F 1/045* (2013.01); *B32B 5/02* (2013.01); *B32B 5/24* (2013.01); *B32B 29/002* (2013.01); *B44C 3/02* (2013.01); *B44F 1/08* (2013.01); *B44F 7/00* (2013.01); *B32B 3/08* (2013.01); *B32B 3/266* (2013.01); *B32B 2255/00* (2013.01); *B32B 2307/4023* (2013.01); *B32B 2307/416* (2013.01); *B32B 2451/00* (2013.01)

(58) Field of Classification Search
CPC ... G09F 7/08; G09F 13/14; G09F 7/00; G09F 13/00
See application file for complete search history.

(56) References Cited

U.S. PATENT DOCUMENTS

| | | | | |
|---|---|---|---|---|
| 1,193,963 | A * | 8/1916 | Allen ........................ | G09F 7/08 40/615 |
| 1,670,327 | A * | 5/1928 | Tobener ................. | G02B 5/126 359/542 |
| 1,732,822 | A * | 10/1929 | Wehr ...................... | G09F 13/14 359/546 |
| 1,811,989 | A * | 6/1931 | Willman ................. | B60R 13/10 40/205 |
| 1,887,523 | A * | 11/1932 | Schenkel ................ | G09F 13/26 40/570 |

(Continued)

*Primary Examiner* — Cassandra Davis
(74) *Attorney, Agent, or Firm* — Georgiy L. Khayet

(57) ABSTRACT

Provided is a painting structure that comprises a reflecting plate and one or more painting layers. The reflecting plate may have a reflective surface. The one or more painting layers may comprise a painting region and a non-painting region. The non-painting region may be oppositely arranged with respect to the reflective surface. The one or more painting layers may be spaced a predetermined distance away from the reflecting plate. At least the painting region may have a plurality of through holes, which may be irregularly arranged and may differ in shape.

8 Claims, 6 Drawing Sheets

(56) References Cited

U.S. PATENT DOCUMENTS

| | | | | | |
|---|---|---|---|---|---|
| 1,992,095 | A | * | 2/1935 | Reed | G09F 11/26 40/472 |
| 2,004,635 | A | * | 6/1935 | Price | G09F 7/00 40/615 |
| 2,216,424 | A | * | 10/1940 | Stehlin | G09F 13/00 362/249.01 |
| 2,241,625 | A | * | 5/1941 | Tway | G09F 7/00 40/615 |
| 2,301,471 | A | * | 11/1942 | Stewart | G09F 13/00 314/105 |
| 2,871,598 | A | * | 2/1959 | Pawelka | G09F 13/00 40/558 |
| 3,921,324 | A | * | 11/1975 | Flannery | B60R 13/10 362/497 |
| 4,741,119 | A | * | 5/1988 | Baryla | G09F 7/12 40/594 |
| 5,161,343 | A | * | 11/1992 | Edwards | E06B 5/006 312/108 |
| 2010/0101126 | A1 | * | 4/2010 | Keil | B32B 38/06 40/582 |

* cited by examiner and a painting structure. The framework may have a side portion and a front portion. The painting structure may have a reflecting plate. The reflecting plate may have a reflective surface. The reflecting plate may be a base plate of the painting frame structure. The painting structure may further have one or more painting layers that may include a painting region and a non-painting region. The non-painting region may be oppositely arranged with respect to the reflective surface of the reflecting plate. The one or more painting layers may be spaced from the reflecting plate. At least the painting region of the one or more painting layers may have a plurality of through holes, which may be irregularly arranged on the one or more painting layers and differ in shape. The painting structure may be located in the framework and may be retained by the side portion of the framework.

The method for manufacturing a painting frame structure may include providing a framework and a painting structure. The framework may have a side portion and a front portion. The method may commence with providing of the painting structure which may include a reflecting plate that may have a reflective surface. Furthermore, one or more painting layers may be provided. The one or more painting layers may have a painting region and a non-painting region. In particular, the non-painting region of the one or more painting layers may be arranged opposite to the reflective surface of the reflecting plate. The one or more painting layers may be spaced a distance away from the reflecting plate. The painting region of the one or more painting layers may contain a plurality of through holes. The plurality of these through holes may be irregularly arranged on the one or more painting layers and may differ in shape and size. The method may further include locating the painting structure in the framework by retaining the painting structure by the side portion of the framework.

In further exemplary embodiments, modules, subsystems, or devices can be adapted to perform the recited steps. Other features and exemplary embodiments are described below.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
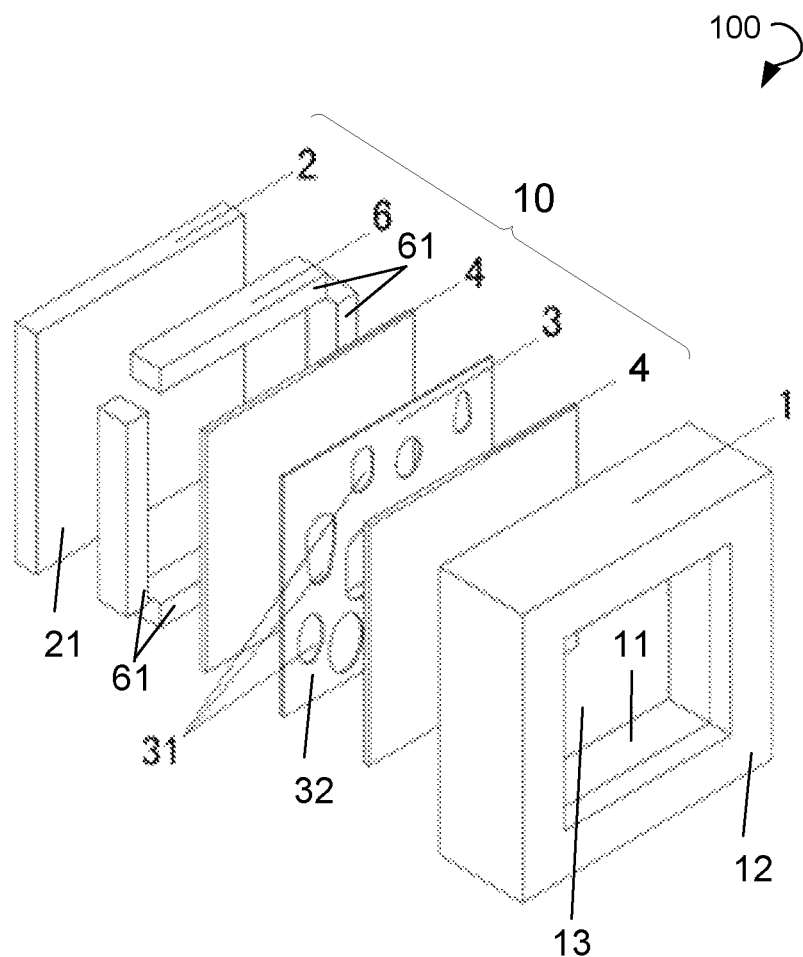
FIG. 1 is an exploded perspective view of a painting frame structure, according to an example embodiment.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

A painting structure, a painting frame structure, and a method for manufacturing the painting frame structure are described herein. The painting frame structure may be configured to provide paintings having a three-dimensional effect and highlighted color gradation. Thus, the paintings provided using the painting frame structure may have an improved ornamental effect.

PAINTING STRUCTURE AND PAINTING FRAME STRUCTURE

CROSS-REFERENCE TO RELATED APPLICATIONS

This application is Continuation-in-Part and claims priority of CN Patent Application No. 201520095186.3 filed on Feb. 10, 2015, entitled "A PAINTING STRUCTURE AND A PAINTING FRAME STRUCTURE HAVING THE SAME," which is incorporated herein by reference in its entirety.

FIELD

The present utility model relates to a painting structure and a painting frame structure.

BACKGROUND

Conventionally, a common painting frame structure comprises a framework and a painting layer. The framework has a base plate and the painting layer is located on the base plate. When light from an external source reaches the painting frame structure, the paintings mounted on the surface of the painting layer are viewable and can to be seen by the viewer. However, when this technique is used, the external light source illuminates the paintings such that the view presents a single two-dimensional plane, lacking any three-dimensional effect. This two-dimensional plane reduces the ornamental effect of the painting as the color gradation of paintings is not distinct.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present disclosure relates to a painting structure, a painting frame structure, and a method for manufacturing the painting frame structure. The painting structure may include a reflecting plate and one or more painting layers. The reflecting plate may have a reflective surface. The one or more painting layers may have a painting region and a non-painting region. The non-painting region may be oppositely arranged with respect to the reflective surface. The one or more painting layers may be spaced from the reflecting plate. At least the painting region of the one or more painting layers may have a plurality of through holes, which may be irregularly arranged on the one or more painting layers and differ in shape and size.

The painting frame structure may include a framework

The painting frame structure may include a framework and the painting structure. The painting structure may have a reflecting plate and a painting layer. The painting layer may have a painting region and a non-painting region. A painting may be provided on the painting region (for example, the painting may be printed, painted, deposited, or the like, on the painting region). The non-painting region may serve as a back side of the painting layer and may be oppositely arranged with respect to a reflective surface of the reflecting plate. The painting layer and the reflecting plate may be spaced from each other. The painting region of the painting layer may have a plurality of through holes that may be irregularly arranged and may differ in shape and size.

The painting structure may be inserted into the framework so that the reflecting plate may serve a base plate of the painting frame structure. In the painting frame structure, when light from an external source reaches the painting layer, the light penetrates the through holes on the painting layer, reaches the reflecting plate, and is reflected by the reflecting plate. As the painting layer and the reflecting plate have a certain distance between them, the painting on the painting layer may have the three-dimensional effect and the color gradation of the painting may be highlighted.

Figure 2:
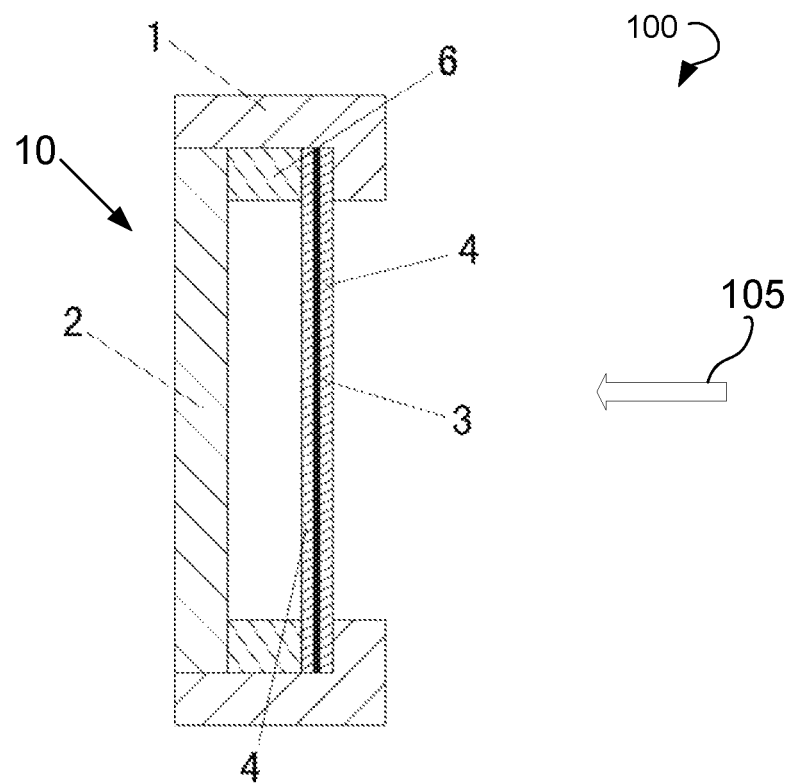
FIG. 2 is a sectional view of a painting frame structure, according to an example embodiment.

Referring now to the drawings, FIG. 1 illustrates an exploded perspective view of a painting frame structure 100, according to an example embodiment. FIG. 2 illustrates a sectional view of the painting frame structure 100, according an example embodiment.

As shown in FIG. 1 and FIG. 2, the painting frame structure 100 may include a framework 1 and a painting structure 10. The framework 1 may include a side portion 11 and a front portion 12. The side portion 11 may be configured in a form of a hollow rectangular element. The front portion 12 may be disposed on the side portion 11. The front portion 12 may have a window 13 of certain shape. For example, the window 13 may be rectangular, square, round, oval, fee form, and the like.

The painting structure 10 may be mounted in the framework 1 and may be supported by the framework 1. More specifically, the painting structure 10 may include a reflecting plate 2 and a painting layer 3. When the painting structure 10 is inserted into the framework 1, the reflecting plate 2 can be a base plate of the painting frame structure 100. The reflecting plate 2 may have a reflecting surface 21 that may face the painting layer 3. The painting layer 3 may have a painting region 32 and a non-painting region (not shown). In particular, the non-painting region may be a back side of the painting layer 3. The painting region 32 of the painting layer 3 may be oppositely arranged with respect to the reflecting surface 21 of the reflecting plate 2. Furthermore, the painting layer 3 may be parallel to the reflective surface 21 of the reflecting plate 2.

The painting layer 3 may have a plurality of through holes 31, which may be irregularly arranged on the painting layer 3. The through holes 31 may differ in shape and size. Specifically, at least the painting region 32 of the painting layer 3 may have the plurality of through holes 31, which may have various shapes and sizes. As used hereby, the expressions "may be irregularly arranged" and "may have various shapes and sizes" mean that the shapes and sizes of the plurality of through holes 31 are not totally identical or totally different. In other words, the through holes 31 do not have the identical shape or size, and each of the through holes 31 is randomly arranged on the painting layer 3.

The painting layer 3 can include any layer that can be painted thereon and on which a plurality of through holes 31 can be formed. In an example embodiment, the painting layer 3 includes a fibrous layer, which can be formed by a pressing process by pressing a slurry (such as a paper pulp). The slurry may contain crude and fine fibers, and the plurality of through holes 31 may be naturally formed during the pressing process. As used herein, the wording "naturally formed" means that the forming of the through holes 31 does not need any other molding or processing procedures, because the through holes 31 are naturally formed during the pressing process of the fibrous layer. Moreover, a fiber (not shown), such as the crude and fine fibers, of the painting layer 3 may have irregular orientation. The fibrous layer can include paper, cloth, or similar materials, such as Chinese art paper and the like.

The painting structure 10 may further include retaining members 4 for retaining the painting layer 3 in a planar shape and making the painting region 32 of the painting layer 3 visible. The retaining members 4 may be formed as retaining plates.

In an example embodiment, the painting structure 10 includes two retaining members 4, and the painting layer 3 may be gripped between two retaining members 4. The painting layer 3 may be made of material that does not keep its shape, such as paper, cloth, and so forth. Therefore, two retaining members 4 may grip the painting layer 3 between them to keep the painting layer 3 in the planar shape. More specifically, one of retaining members 4 may be located adjacent to the painting region 32 of the painting layer 3 and the other of the retaining members 4 may be located adjacent to the non-painting region of the painting layer 3. The retaining members 4 may be transparent. Therefore, the painting on the painting layer 3 can be seen through the retaining members 4. Moreover, two retaining members 4 may grip the painting layer 3 from two sides so as to retain the painting layer 3 within the framework 1 and prevent the painting layer 3 from being damaged unintentionally.

The painting structure 10 may further include a first partitioning component 6. The first partitioning component 6 may be located between the reflecting plate 2 and the painting layer 3 so as to partition the painting layer 3 and the reflecting plate 2 from each other. More specifically, the first partitioning component 6 may be adjacent to the reflective surface 21 of the reflecting plate 2 and the non-painting region of the painting layer 3. In an example embodiment, the painting layer 3 can be gripped between the retaining members 4, and the first partitioning component 6 may be located between the reflecting plate 2 and the retaining member 4 that is adjacent to the non-painting region of the painting layer 3.

In an example embodiment, the first partitioning component 6 can include four partitioning bars 61 disposed at the edges of the reflecting plate 2 and at the edges of the painting layer 3, as shown in FIG. 1. The first partitioning component 6 can also include any other component of any structure or at any position that can partition the reflecting plate 2 and the painting layer 3 by being located between the reflective surface 21 of the reflecting plate 2 and the non-painting region of the painting layer 3.

Moreover, according to an example embodiment, when a viewer faces the painting layer 3, that is, when viewing to the painting structure 10 from right to left as shown by the arrow 105 on FIG. 2, the first partitioning component 6 is blocked by the framework 1. In particular, the first partitioning component 6 may be retained within the framework 1 between the painting layer 3 and the reflecting plate 2 so that the first partitioning component 6 cannot be seen by the viewer. More specifically, the first partitioning component 6 may be located on a periphery of the painting layer 3, as well as on a periphery of the reflecting plate 2. In particular, as shown on FIG. 1, the partitioning bars 61 may be disposed at the edges of the painting layer 3 and the reflecting plate 2. Furthermore, the first partitioning component 6 may be disposed so as to contact the side portion 11 of the framework 1.

The window 13 of the front portion 12 of the framework 1 may be sized so that edges (i.e., elements that enclose the window 13) of the front portion 12 may cover peripheral portions of the retaining members 4, the painting layer 3, and the reflecting plate 2 for a distance that is equal to or greater than a width of the partitioning bars 61. In other words, the width of the edges that enclose the window 13 on the front portion 12 may be equal to or greater than the width of the partitioning bars 61. Thus, when viewers are enjoying the painting, the first partitioning component 6 is hidden (i.e., cannot be seen by the viewers). Therefore, the first partitioning component 6 cannot affect the appearance of the painting.

When the light from an external source reaches the painting structure 10 of the painting frame structure 100, the light penetrates the through holes 31 on the painting layer 3, reaches the reflecting plate 2, and is reflected by the reflecting surface 21 of the reflecting plate 2. Because the painting layer 3 and the reflecting plate 2 are spaced from each other for a certain distance, the painting on the painting layer 3 may thus have the three-dimensional effect, and the color gradation of the painting may be highlighted.

Moreover, as the painting layer 3 may be a fibrous layer formed by crude and fine fibers, light transmittance of crude fibers and light transmittance of fine fibers may differ, so the three-dimensional effect and color gradation of the painting disposed on the painting layer 3 can be further increased.

Figure 3:
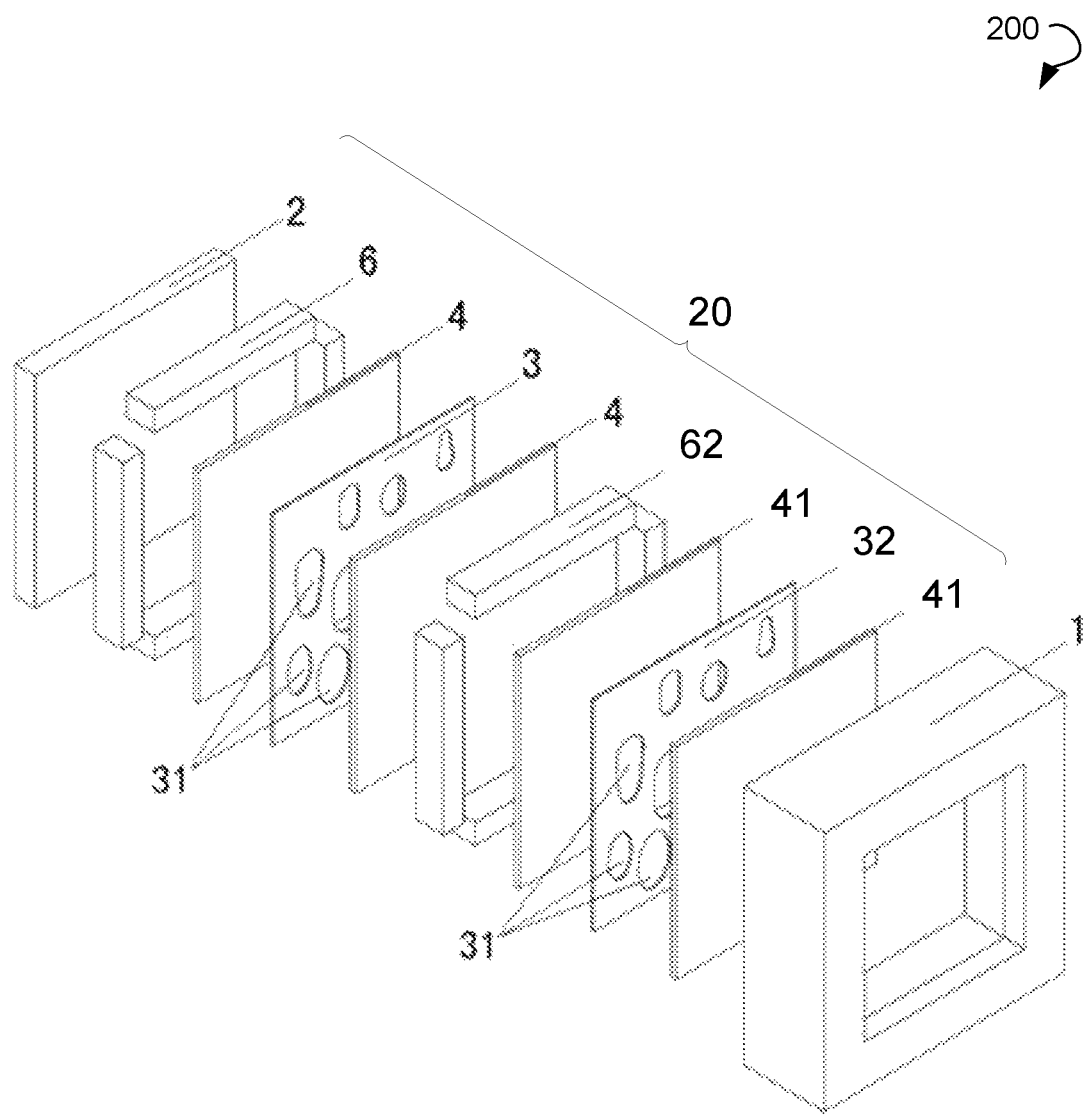
FIG. 3 is an exploded perspective view of a painting frame structure, according to an example embodiment.
Figure 4:
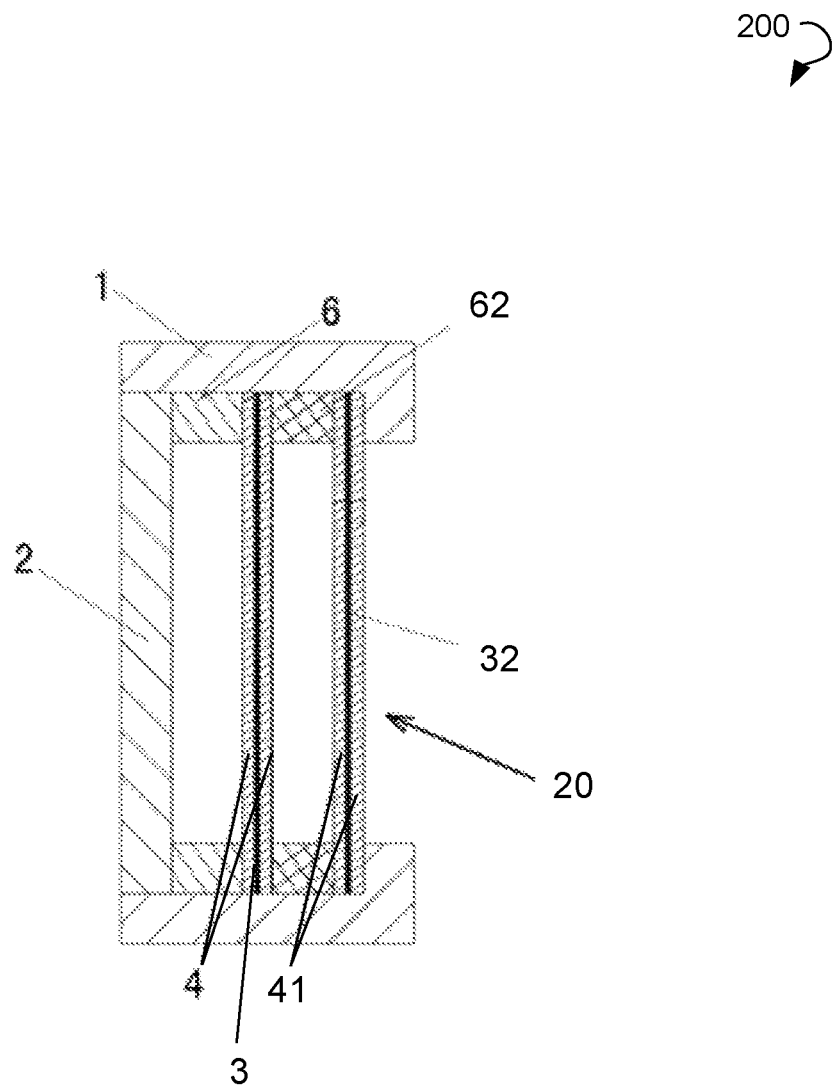
FIG. 4 is a sectional view of a painting frame structure, according to an example embodiment.

In addition to the example embodiment described in FIG. 1 and FIG. 2, in which the painting structure may have only one painting layer, the painting structure may also comprise a plurality of painting layers (for example, two painting layers, according to another example embodiment, as shown on FIG. 3 and FIG. 4).

FIG. 3 is an exploded perspective view of a painting frame structure 200 having a painting structure 20 that includes a plurality of painting layers. FIG. 4 is a sectional view of the painting frame structure 200 having the painting structure 20 that includes the plurality of painting layers.

As shown in FIG. 3 and FIG. 4, the painting frame structure 200 may include the painting structure 20 and a framework 1. The painting structure 20 may include a reflecting plate 2, a painting layer 3, and a first partitioning component 6 disposed between the reflecting plate 2 and the painting layer 3. The painting layer 3 may be gripped by retaining members 4. Therefore, the first partitioning component 6 may be located adjacent to the retaining member 4 that is located on a non-painting region of the painting layer 3. The first partitioning component 6 can have the identical structure as that of the first partitioning component 6 shown in FIG. 1 and FIG. 2.

The painting structure 20 may further include a second painting layer shown as a painting layer 32. The painting layer 32 may be gripped by retaining members 41. In an example embodiment, the retaining members 4 and the retaining members 41 may include retaining plates, and every two retaining plates may correspond to one of the painting layer 3 and the painting layer 32 and may grip the painting layer 3 and the painting layer 32, respectively. In other words, each of the painting layer 3 and the painting layer 32 may be gripped by two retaining members 4 or two retaining members 41, respectively.

As each of the painting layer 3 and the painting layer 32 is capable of being gripped by two retaining members 4 or two retaining members 41, the painting layer 3 and the painting layer 32 thus may not interfere with each other. Therefore, the paintings on the painting layer 3 and the painting layer 32 may be prevented from being damaged and the life of the paintings may be increased.

Furthermore, the painting structure 20 may also include a second partitioning component 62 that may have the identical structure as that of the first partitioning component 6 described above with respect to FIG. 1 and FIG. 2. The second partitioning component 62 may be disposed between two painting layers, such as the painting layer 3 and the painting layer 32. Furthermore, as both of the painting layer 3 and the painting layer 32 may be gripped by the retaining members 4 and the retaining members 41, respectively, the second partitioning component 62 may be located between the retaining member 4 located on a painting region of the painting layer 3 and the retaining member 41 located on a non-painting region of the painting layer 32. The second partitioning component 62 may space two adjacent painting layers, namely the painting layer 3 and the painting layer 32, at a predetermined distance.

Because the painting layer 3 and the painting layer 32 are partitioned by the second partitioning component 62, the three-dimensional effect and gradation effect of the painting of each of the painting layer 3 and the painting layer 32 may be increased, and, thus, the ornamental effect of the whole painting may be increased.

As described above, the painting layer 3, as well as the painting layer 32, may be a fibrous layer. Optionally, the painting layer 3 and the painting layer 32 can be made of cloth, such as silk.

Furthermore, the reflecting plate 2 may be used as the base plate of the painting frame structure 100 or the painting frame structure 200. Optionally, the reflecting plate 2 may not be used as the base plate of the painting frame structure 100 or the painting frame structure 200. In such a case, the painting frame structure 100 or the painting frame structure 200 can be additionally provided with a base plate.

Figure 5:
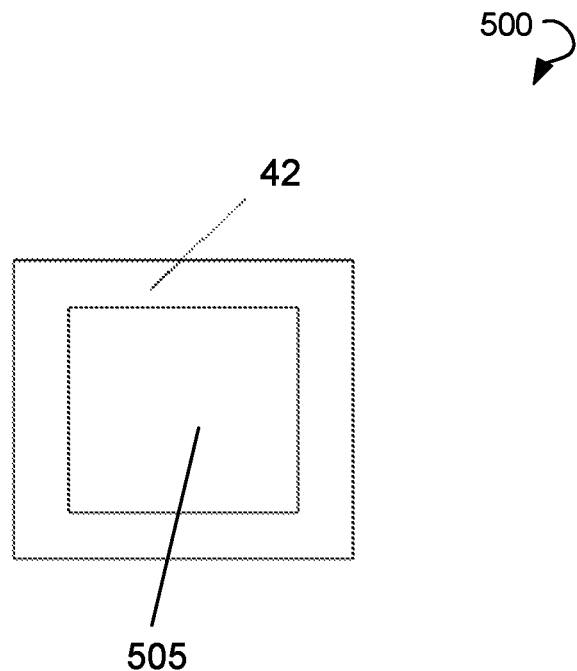
FIG. 5 is a front view of a retaining member of a painting frame structure, according to an example embodiment.

Furthermore, the retaining members may include transparent plates. Optionally, in an alternative example embodiment, the retaining members can be non-transparent plates. FIG. 5 shows a front view 500 of a retaining member 42, which may be the most external retaining member of a painting frame structure and may include a non-transparent plate. The retaining member 42 may have a window 505 corresponding to a painting region of a painting layer so as to make the painting region visible. The window 505 can be an open or transparent part of the retaining member 42 and, therefore, can make the painting region visible. The size of edges around the window 42 may be selected so as to hide a first partitioning component and a second partitioning component. The width of the edges around the window 42 may be equal or greater than the width of partitioning bars of the first partitioning component and the second partitioning component. Therefore, when a viewer faces the painting frame structure, the viewer can see a painting region of the painting layer, but cannot see the first partitioning component or the second partitioning component. Thus, the ornamental effect of the painting may not be affected.

In an example embodiment, the most external retaining member, such as the retaining member 42, may be a non-transparent plate and may serve as a front portion of a framework of the painting frame structure.

The description provided above shows an example embodiment of the painting frame structure having one panting layer and an example embodiment of the painting frame structure having two painting layers. However, other embodiments or modifications of the painting frame structure are possible; for example, the painting frame structure may have more than two painting layers.

Optionally, the painting structure can include three or more painting layers. Moreover, the three or more painting layers may be gripped between retaining members. More specifically, each of the painting layers may be gripped between two retaining members. Optionally, two adjacent painting layers of the three or more painting layers can have a partitioning component disposed between them to partition the two adjacent painting layers.

Figure 6:
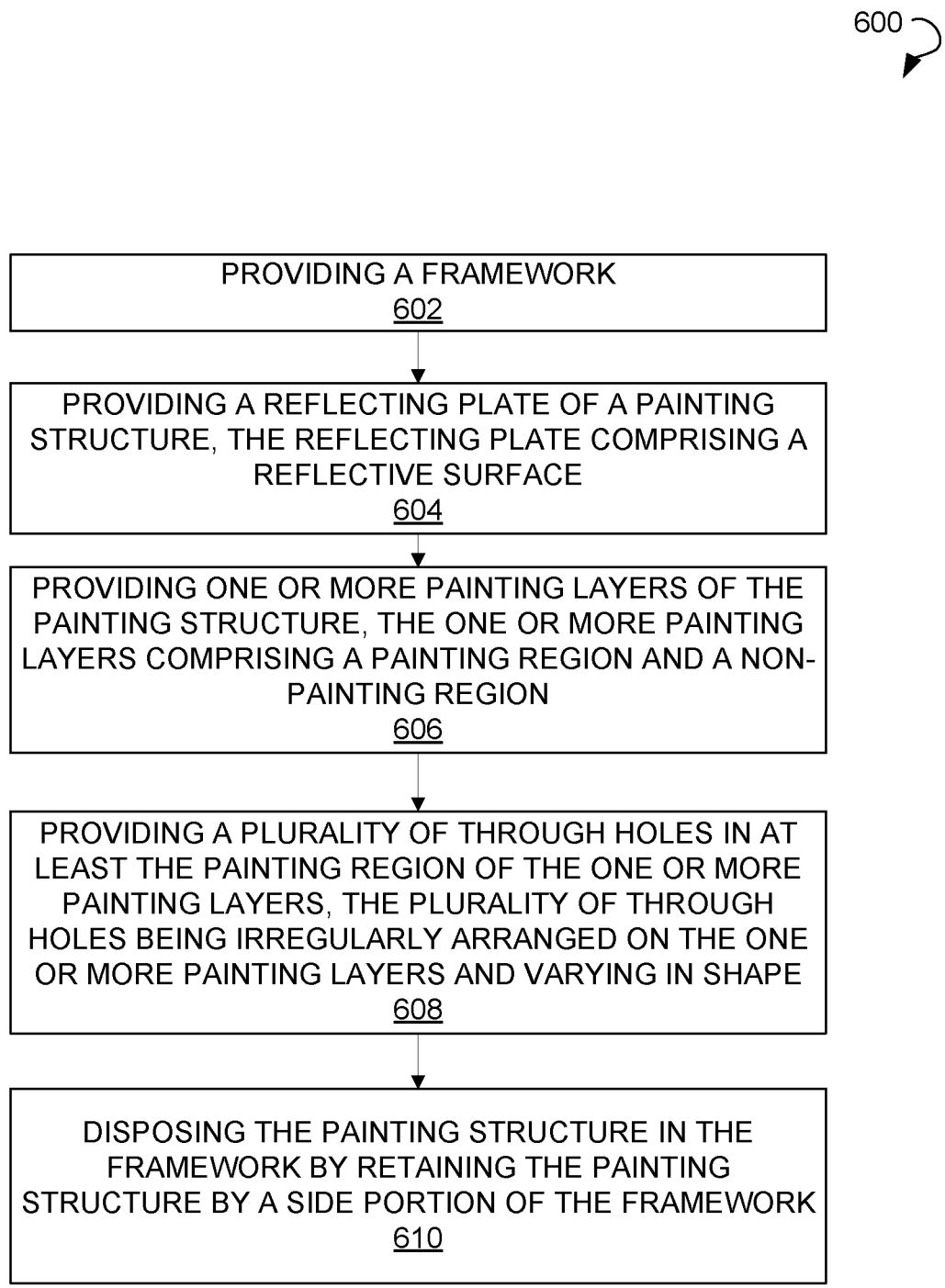
FIG. 6 is a flow chart illustrating a method for manufacturing a painting frame structure, according to an example embodiment.

FIG. 6 is a flow chart illustrating a method 600 for manufacturing a painting frame structure, according to an example embodiment. The method 600 may commence with providing a framework at operation 602. The framework may have a side portion and a front portion. The method 600 may continue with providing a painting structure. The providing a painting structure is described below with respect to operations 604, 606, and 608. The operation 604 may include providing a reflecting plate. The reflecting place may have a reflective surface. At operation 606, one or more painting layers may be provided. The one or more painting layers may have a painting region and a non-painting region. More specifically, providing one or more painting layers may include arranging the non-painting region oppositely with respect to the reflective surface and spacing the one or more painting layers from the reflecting plate. At operation 608, a plurality of through holes may be provided in at least the painting region of the one or more painting layers. The plurality of through holes may be irregularly arranged on the one or more painting layers and may differ in shape and size. The method 600 may continue with locating the painting structure in the framework at operation 610. More specifically, the painting structure may be retained by the side portion of the framework.

In an example embodiment, the method 600 further includes providing the painting structure with retaining members. The retaining members may retain the one or more painting layers in a planar shape to make the painting region visible. At least an external retaining member of the retaining members may be disposed in contact with the front portion of the framework. The external retaining member may have a window disposed in front of the painting region of the one or more painting layers to make the painting region visible. In an example embodiment, the retaining members may include a plurality of retaining plates. Every two retaining plates may correspond to a painting layer of the one or more painting layers. Furthermore, the every two retaining plates may grip the painting layer.

In an example embodiment, the method 600 may further include providing a first partitioning component between the reflecting plate and the one or more painting layers. The first partitioning component may be adjacent to the reflective surface of the reflecting plate and the non-painting region of the one or more painting layers. The first partitioning component may be retained within the framework between the reflecting plate and the one or more painting layers and may be located on a periphery of the one or more painting layers. More specifically, the first partitioning component may include a plurality of partitioning bars, which may be located on the periphery of the one or more painting layers. Furthermore, the first partitioning component may be disposed so as to contact the side portion of the framework.

In an example embodiment, the method 600 may further include providing a second partitioning component. The second partitioning component may be gripped by two of the retaining members between two adjacent painting layers of the one or more painting layers. The two adjacent painting layers may be parallel to the reflecting plate. The second partitioning component may be retained by the framework between the reflecting plate and the two adjacent painting layers. The second partitioning component may be located on a periphery of the two adjacent painting layers. Furthermore, the second partitioning component may be disposed so as to contact the side portion of the framework.

Thus, various painting structures, painting frame structures, and methods for manufacturing the painting frame structures have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A painting structure comprising:
    a reflecting plate comprising a reflective surface;
    one or more painting layers comprising a painting region and a non-painting region, the non-painting region being faced with respect to the reflective surface, the painting region being adapted to receive a painting, the one or more painting layers being spaced a predetermined distance away from the reflecting plate, wherein at least the painting region of the one or more painting layers has a plurality of through holes, which are irregularly arranged on the one or more painting layers and differ in shape, wherein the one or more painting layers include a fibrous layer;
    a first partitioning component located between the reflecting plate and the one or more painting layers, the first partitioning component being adjacent to the reflective surface of the reflecting plate and the non-painting region of the one or more painting layers, the first partitioning component being located on a periphery of the one or more painting layers; and
    retaining members retaining the one or more painting layers in a planar shape to make the painting region visible;
    wherein the one or more painting layers include a plurality of painting layers, wherein the retaining members include a plurality of retaining plates, each of the plurality of painting layers being gripped between two of the plurality of retaining plates.

2. The painting structure of claim 1, further comprising a second partitioning component gripped by two of the plurality of retaining plates between two adjacent painting layers of the one or more painting layers, the second partitioning component being located between the painting region of a first of the two adjacent painting layers and the non-painting region of a second of the two adjacent painting layers, the second partitioning component being located on a periphery of the two adjacent painting layers.

3. The painting structure of claim 1, wherein the one or more painting layers are parallel to the reflecting plate.

4. The painting structure of claim 1, wherein the fibrous layer is formed from fibers.

5. The painting structure of claim 4, wherein the fibers of the fibrous layer have an irregular orientation.

6. The painting structure of claim 1, wherein the one or more painting layers are made of silk.

7. A painting frame structure comprising:

a framework having a side portion and a front portion; and a painting structure, wherein the painting structure comprises:

a reflecting plate comprising a reflective surface;

one or more painting layers comprising a painting region and a non-painting region, the non-painting region being faced with respect to the reflective surface, the painting region being adapted to receive a painting, the one or more painting layers being spaced from the reflecting plate, wherein at least the painting region of the one or more painting layers has a plurality of through holes, which are irregularly arranged on the one or more painting layers and differ in shape;

a first partitioning component located between the reflecting plate and the one or more painting layers, the first partitioning component being adjacent to the reflective surface of the reflecting plate and the non-painting region of the one or more painting layers, wherein the first partitioning component is retained within the framework between the reflecting plate and the one or more painting layers and contacts the side portion of the framework; and retaining members retaining the one or more painting layers in a planar shape to make the painting region visible, wherein the retaining members comprise an external retaining member being a non-transparent plate, the non-transparent plate being disposed in contact with the front portion of the framework and having a window disposed in front of the painting region of the one or more painting layers to make the painting region visible;

wherein the one or more painting layers include a plurality of painting layers and the retaining members include a plurality of retaining plates, wherein each of the plurality of painting layers is gripped between two of the plurality of retaining plates;

wherein the painting structure is located in the framework by retaining the painting structure via the side portion of the framework, wherein the reflecting plate is a base plate of the painting frame structure.

8. The painting frame structure of claim 7, wherein the painting structure further comprises:

a second partitioning component gripped by two of the plurality of retaining plates between two adjacent painting layers of the one or more painting layers, wherein the two adjacent painting layers are parallel to the reflecting plate, wherein the second partitioning component is retained by the framework between the reflecting plate and the one or more painting layers and contacts the side portion of the framework.

\* \* \* \* \*